(12) United States Patent
Sekiguchi et al.

(10) Patent No.: US 6,464,472 B1
(45) Date of Patent: Oct. 15, 2002

(54) CIRCULATION FAN APPARATUS AND CIRCULATION-FAN DRIVING MOTOR (75) Inventors: Shinichi Sekiguchi, Kanagawa (JP); Hiroyuki Shinozaki, Kanagawa (JP); Toshimitsu Barada, Tokyo (JP); Toshiharu Nakazawa, Kanagawa (JP); Takeshi Kawamura, Kanagawa (JP)

(73) Assignees: Ebara Corporation, Tokyo (JP); Komatsu Ltd., Tokyo (JP)

( * ) Notice: Subject to any disclaimer, the term of this patent is extended or adjusted under 35 U.S.C. 154(b) by 0 days.

(21) Appl. No.: 09/622,367
(22) PCT Filed: Feb. 18, 1999
(86) PCT No.: PCT/JP99/00709
§ 371 (c)(1), (2), (4) Date: Aug. 16, 2000
(87) PCT Pub. No.: WO99/42731
PCT Pub. Date: Aug. 26, 1999

(30) Foreign Application Priority Data

Feb. 18, 1998 (JP) .............................. 10-052782
Nov. 30, 1998 (JP) .............................. 10-340578

(51) Int. Cl.$^7$ ................................................ F04B 17/00
(52) U.S. Cl. ..................... 417/351; 417/365; 310/90.5
(58) Field of Search ............................ 417/365, 351, 417/423.1, 423.12; 310/90.5

(56) References Cited

U.S. PATENT DOCUMENTS

| | | | | |
|---|---|---|---|---|
| 2,073,404 | A | * 3/1937 | Hobbs | ........................ 230/117 |
| 3,650,581 | A | 3/1972 | Boden et al. | |
| 4,037,886 | A | * 7/1977 | Boden et al. | ................... 308/10 |
| 4,500,142 | A | 2/1985 | Brunet | |
| 5,023,884 | A | 6/1991 | Akins et al. | |
| 5,126,610 | A | * 6/1992 | Fremerey | .................... 310/90.5 |
| 5,848,089 | A | 12/1998 | Sarkar et al. | |
| 5,939,813 | A | * 8/1999 | Schob | ........................ 310/254 |
| 5,980,199 | A | * 11/1999 | Godichon | ........................ 415/1 |

FOREIGN PATENT DOCUMENTS

| | | | |
|---|---|---|---|
| DE | 1750602 | 3/1971 | |
| DE | 9017166 U | 5/1991 | |
| DE | 42 27 013 A1 | 2/1994 | |
| EP | 0413 851 A1 | 2/1991 | |
| JP | 55132414 | * 10/1980 | ........... F16C/32/04 |
| JP | 63-228692 | 9/1988 | |
| JP | 1-189974 | 7/1989 | |
| JP | 2-301698 | 12/1990 | |
| JP | 02301698 | * 12/1990 | ........... F04D/19/04 |
| JP | 10-173259 | 6/1998 | |

OTHER PUBLICATIONS

Patent Abstracts of Japan, vol. 4, No. 187 (M–048) & JP 55 132414 A *Abstract*.

* cited by examiner

*Primary Examiner*—Charles G. Freay
(74) *Attorney, Agent, or Firm*—Armstrong, Westerman & Hattori, LLP (57) ABSTRACT

A circulation fan apparatus including a hermetic vessel 1 containing a corrosive process gas therein, and a circulation fan 2 installed in the hermetic vessel, rotors 2-1, 2-2 of the circulation fan are rotatably supported by bearings, wherein the bearings comprises control-type radial magnetic bearings 4, 5 and at least control-type axial magnetic bearing 6, 7, displacement sensor targets 4-1, 5-1, 6-1, and 7-1 and rotor-side magnetic poles 4-2, 5-2, 6-2, and 7-2 of radial magnetic bearings 4 and 5 and axial magnetic bearings 6 and 7 are fixed to the rotors 2-1 and 2-2 of the circulation fan 2 and are disposed in the hermetic space communicating with the hermetic vessel, and displacement sensors 4-3, 5-3, 6-3, and 7-3 and stator-side magnetic poles 4-4, 5-4, 6-4, and 7-4 opposing the displacement sensor targets and rotor-side magnetic poles are disposed outside of the hermetic vessel with cans 14, 15, 17, and 18 interposed therebetween, whereby even when the circulation fan 2 is rotated at a high speed and under a high load, the process gas is not contaminated, ensuring maintenance-free operation, and furthermore, an installation space can be reduced.

11 Claims, 8 Drawing Sheets

CIRCULATION FAN APPARATUS AND CIRCULATION-FAN DRIVING MOTOR

TECHNICAL FIELD

The present invention relates to a circulation fan apparatus having a circulation fan installed in a hermetic vessel containing a corrosive gas, and the invention also relates to a circulation-fan driving motor.

BACKGROUND ART

Figure 8:
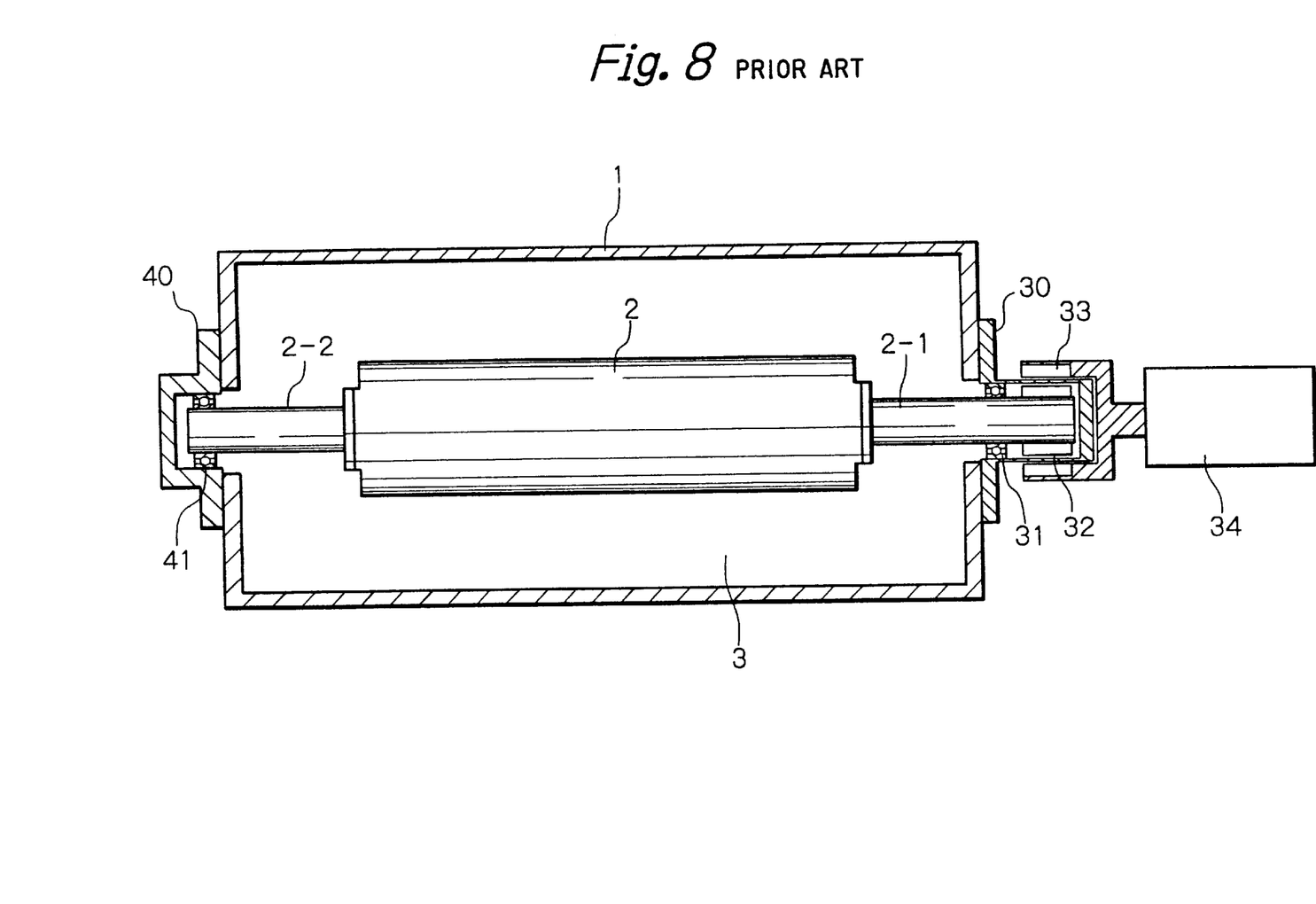
FIG. 8 is a cross-sectional view showing an example of construction of a conventional circulation fan apparatus.

FIG. 8 shows an example construction of a conventional circulation fan apparatus, in which a circulation fan is installed in a hermetic vessel. In such a circulation fan apparatus, a corrosive process gas 3 necessary for various chemical processes and/or physical processes is enclosed in a hermetic vessel 1 at a predetermined pressure, and the process gas 3 is circulated by a circulation fan 2 in the hermetic vessel 1 to thereby perform predetermined processes.

A drive-side rotor 2-1 and a non-drive-side rotor 2-2 are fixed at both ends of a circulation fan 2, respectively. The drive-side rotor 2-1 is rotatably supported by a rotation bearing 31 supported by a drive-side bearing cover 30 and the non-drive-side rotor 2-2 is rotatably supported by a rotation bearing 41 supported by a non-drive-side bearing cover 40.

Furthermore, a driven magnet 32 is fixed to the drive-side rotor 2-1, and a driving magnet 33 is arranged outside of the hermetic vessel 1 in a position opposing the driven magnet 32, with the drive-side bearing cover 30 sandwiched therebetween. The driving magnet 33 is directly connected to a motor 34 to transfer a driving force to the drive-side rotor 2-1 of the circulation fan 2.

In the conventional apparatus stated above, the rotation bearing 31 and rotation bearing 41 are arranged in a hermetic space communicating with the hermetic vessel 1; therefore, lubricant used in the rotation bearings tends to contaminate the process gas. This causes a deterioration in the stability and reliability of processing, and necessitates relatively frequent replacement of the process gas. Furthermore, when the number of revolutions of the circulation fan 2 and bearing load are increased, the service life of the rotation bearings is shortened. Therefore, as the rotation bearings 31 and 41 are degraded, metal dust is generated and contaminates the process gas, contributing to a need to replace the process gas.

Furthermore, the motor 34 is disposed outside of the vessel, and a magnetic coupling formed of the driven magnet 32 and the driving magnet 33, which magnetically transfer a driving force, are used to transfer rotation force to the circulation fan 2. Therefore, when the number of revolutions is increased, the motor 34 and the magnets (the driven magnet 32 and the driving magnet 33) of larger sizes must be used, thus necessitating the use of a large installation space for the apparatus.

In consideration of the above problems, an object of the present invention is to provide a circulation fan apparatus and a circulation-fan driving motor, in which even when a circulation fan is rotated at high speed and under a high load, a process gas is not contaminated, alleviating the need for maintenance and allowing a smaller installation space to be employed.

Another object of the present invention is to provide a circulation fan apparatus and a circulation-fan driving motor, in which sections contacting with a process gas have anti-corrosion characteristics which thus exhibit a longer service life.

DISCLOSURE OF THE INVENTION

To solve the above problems, according to a first aspect of the present invention, a circulation fan apparatus including a hermetic vessel containing a corrosive process gas therein, and a circulation fan installed in said hermetic vessel, rotors of said circulation fan are rotatably supported by bearings, the apparatus is characterized in that the bearings comprise control-type radial magnetic bearings and at least one control-type axial magnetic bearing, displacement sensor targets and rotor-side magnetic poles of the radial magnetic bearings and axial magnetic bearing are fixed to the rotors of the circulation fan and are disposed in a hermetic space communicating with the hermetic vessel, and displacement sensors and stator-side magnetic poles opposing the displacement sensor targets and the rotor-side magnetic poles of the magnetic bearings are disposed outside of the hermetic vessel with cans or protection layers interposed therebetween.

As described above, the rotors of the circulation fan are rotatably supported by the control-type magnetic bearings, the displacement sensor targets and the rotor-side magnetic poles are disposed in the hermetic space communicating with the hermetic vessel, and the displacement sensors and the stator-side magnetic poles are disposed outside of the hermetic vessel with the cans or the protection layers interposed therebetween. In this case, the displacement sensors and the stator-side magnetic poles which tend to degrade the process gas do not contact with the process gas, so that it is possible to avoid the degradation of the process gas. Furthermore, the circulation fan in the hermetic vessel is supported by the magnetic bearings without being contacted, so that maintenance-free bearings can be realized.

Furthermore, according to a second aspect of the present invention, a circulation-fan driving motor for the abovementioned circulation fan apparatus is characterized in that a motor rotor is fixed to at least one rotor of the circulation fan, the motor rotor is disposed in the hermetic space communicating with the hermetic vessel, and a motor stator opposing the motor rotor is arranged outside of the hermetic vessel, with the can or the protection layer interposed therebetween.

As described above, the motor rotor that provides the circulation fan with a rotational driving force is fixed to the rotor of the circulation fan that is disposed in the hermetic space communicating with the hermetic vessel, and the stator is arranged outside of the hermetic vessel, with the can or the protection layer interposed therebetween. Thus, the stator that tends to degrade the process gas does not contact the process gas, so that it is possible to avoid the degradation of the process gas. Furthermore, since rotational driving force is provided to the circulation fan from the motor rotor, magnetic coupling is not required.

Furthermore, according to a third aspect of the present invention, the circulation fan apparatus described above is characterized in that either the displacement sensor targets of the control-type bearings or the rotor-side magnetic poles or both of them are formed of Permalloy (an iron-nickel alloy including 30 to 80% nickel).

Permalloy has anti-corrosion characteristics against the process gas. Therefore, as described above, by use of Permalloy to form either the displacement sensor targets of the control-type bearings or the rotor-side magnetic poles or both of them, anti-corrosion processing can be omitted for surfaces of the displacement sensor targets and the rotor-side magnetic poles. Accordingly, the distance between the rotor and stator can be reduced, by which performance and efficiency of magnetic bearings can be improved.

Furthermore, according to a fourth aspect of the present invention, the circulation fan apparatus or the circulation-fan driving motor described above is characterized in that the cans are formed of austenitic stainless steel.

Austenitic stainless steel has anti-corrosion characteristics against the process gas, has higher mechanical strength, and in addition, is nonmagnetic. Therefore, as described above, by using the austenitic stainless steel to form the cans, corrosion of the cans by the process gas can be avoided, thinner plates can be used for the cans, the distance between the individual rotors and stators of the magnetic bearings and the motor can be reduced, and in addition, magnetic force generated by the magnetic bearings and the motor will not be disrupted. Accordingly, longer service life, higher performance and efficiency, and smaller sizes can be realized for the circulation fan apparatus and the circulation-fan driving motor.

Furthermore, according to a fifth aspect of the present invention, the circulation fan apparatus or the circulation-fan driving motor described above is characterized in that the cans are formed of a nickel-molybdenum-chromium alloy.

The nickel-molybdenum-chromium alloy has anti-corrosion characteristics against the process gas, has higher mechanical strength, and in addition, is nonmagnetic. Therefore, as described above, by use of the nickel-molybdenum-chromium alloy to form the cans, corrosion of the cans by the process gas can be prevented, thinner plates can be used for the cans, the distance between the individual rotors and stators of the magnetic bearings and the motor can be reduced, and in addition, magnetic force generated by the magnetic bearings and the motor will not be disrupted. Accordingly, a longer service life, higher performance and efficiency, and smaller sizes can be realized for the circulation fan apparatus and the circulation-fan driving motor.

The aforementioned and other objects, characteristics, and advantages of the present invention will be more apparent by referring to a description below in conjunction with the accompanying drawings which show preferred embodiments of the present invention.

BEST MODE FOR CARRYING OUT THE INVENTION

Figure 1:
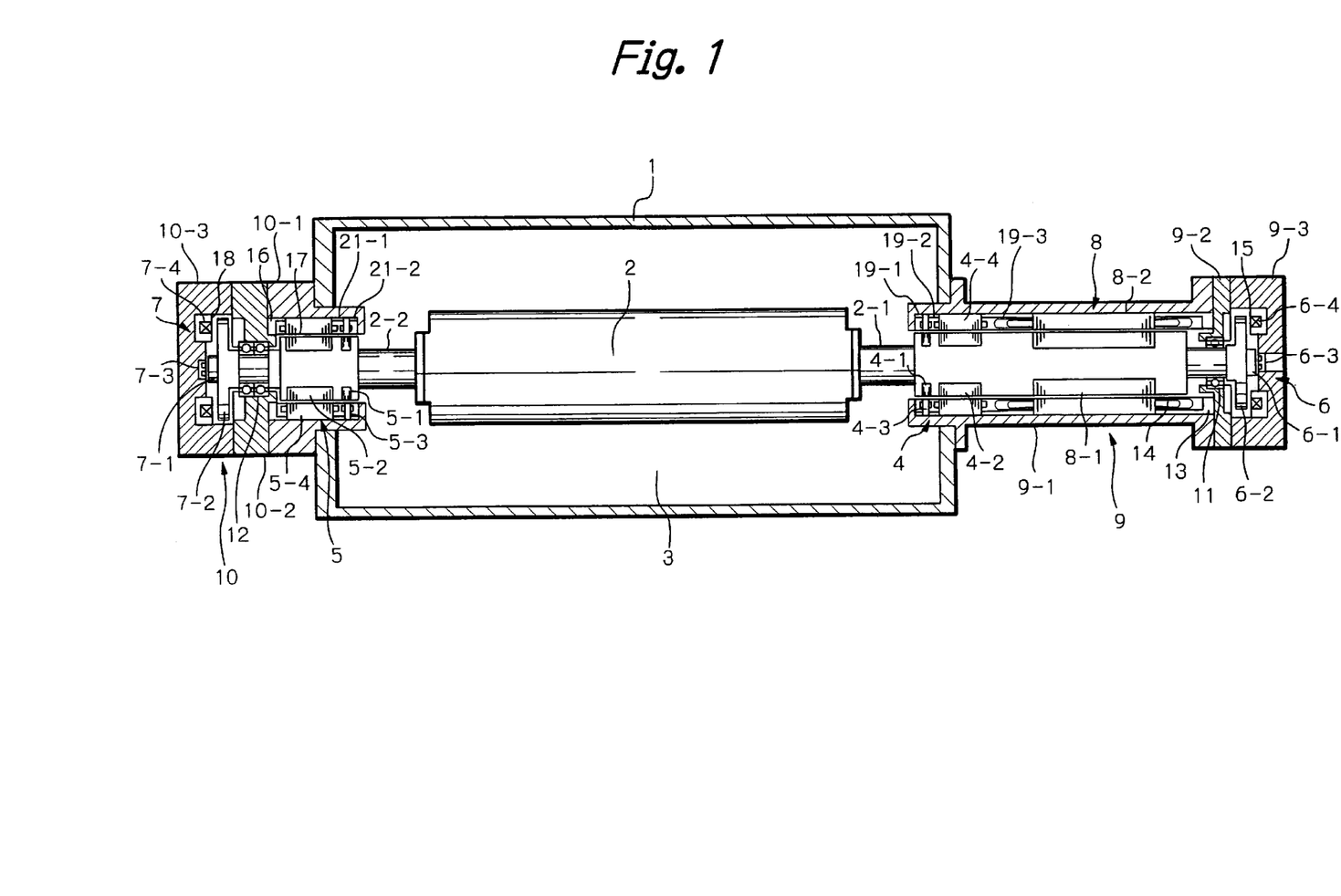
FIG. 1 is a cross-sectional view showing an example of construction of a circulation fan apparatus according to the present invention.

Hereinbelow, referring to the drawings, preferred embodiments of the invention are described. FIG. 1 is a view showing an example of construction of a circulation fan apparatus according to the present invention. In FIG. 1, the same symbols as those in FIG. 8 represent elements or parts which are identical or equivalent to those in FIG. 8.

This circulation fan apparatus is the same as the conventional circulation fan apparatus shown in FIG. 8 with respect to an arrangement in which a corrosive process gas 3 necessary for effecting various chemical and/or physical processes is sealingly contained at a predetermined pressure in a hermetic vessel 1 and the process gas 3 is circulated by a circulation fan 2 to perform predetermined processes.

A drive-side rotor 2-1 and a non-drive-side rotor 2-2 are provided on opposite sides of the circulation fan 2. The drive-side rotor 2-1 is rotatably supported by a control-type radial magnetic bearing 4 and a control-type axial magnetic bearing 6. The non-drive-side rotor 2-2 is journaled by a control-type radial magnetic bearing 5 and a control-type axial magnetic bearing 7 so as to universally rotate thereat. The drive-side rotor 2-1 is rotationally driven by a motor 8.

To the drive-side rotor 2-1 there are provided a displacement sensor target 4-1 and a rotor-side magnetic pole 4-2 of the radial magnetic bearing 4, a rotor 8-1 of the motor 8, and a displacement sensor target 6-1 and a rotor-side magnetic pole 6-2 of the axial magnetic bearing 6.

In the same manner as above, to the non-drive-side rotor 2-2 there are provided a displacement sensor target 5-1 and a rotor-side magnetic pole 5-2 of the radial magnetic bearing 5, and a displacement sensor target 7-1 and a rotor-side magnetic pole 7-2 of the axial magnetic bearing 7.

The hermetic vessel 1 is provided with a drive-side casing 9 and a non-drive-side casing 10 at opposite ends thereof. The drive-side casing 9 is constituted of a casing body 9-1, a housing 9-2 for a protection bearing 11, and a bearing cover 9-3. The non-drive-side casing 10 is constituted of a casing body 10-1, a housing 10-2 for a protection bearing 12, and a bearing cover 10-3. Incidentally, each of the protection bearings 11 and 12 is not normally contacted and is used only for emergencies. On bearing surfaces of these protection bearings 11 and 12, a solid lubricant is applied; therefore, these bearings are not contamination sources.

The casing body 9-1 of the drive-side casing 9 accommodates a displacement sensor 4-3 and a stator-side magnetic pole 4-4 of the radial magnetic bearing 4, and a stator 8-2 of the motor 8. At an inner-circumferential end of the casing body 9-1 on a side of the hermetic vessel 1 and at an inner-circumferential end of a side plate 13, a can 14 is fixed, for example, by welding.

On the bearing cover 9-3 on a side of the hermetic vessel 1, a stator-side magnetic pole 6-4 of the axial magnetic bearing 6 is installed; and on an outer surface of the stator-side magnetic pole 6-4, a can 15 is fixed, for example, by welding. Furthermore, a displacement sensor 6-3 is installed at a thin wall section of the bearing cover 9-3.

The casing body 10-1 of the non-drive-side casing 10 accommodates a displacement sensor 5-3 and a stator-side magnetic pole 5-4 of the radial magnetic bearing 5. At an inner-circumferential end of the casing body 10-1 on a side of the hermetic vessel 1 and at an inner-circumferential end of a side plate 16, a can 17 is fixed, for example, by welding.

In the bearing cover 10-3 on a side of the hermetic vessel 1, a stator-side magnetic pole 7-4 of the axial magnetic bearing 7 is installed; and on an outer surface of the stator-side magnetic pole 7-4, a can 18 is fixed, for example by welding. Furthermore, a displacement sensor 7-3 is installed at a thin wall section of the bearing cover 103.

Figure 2:
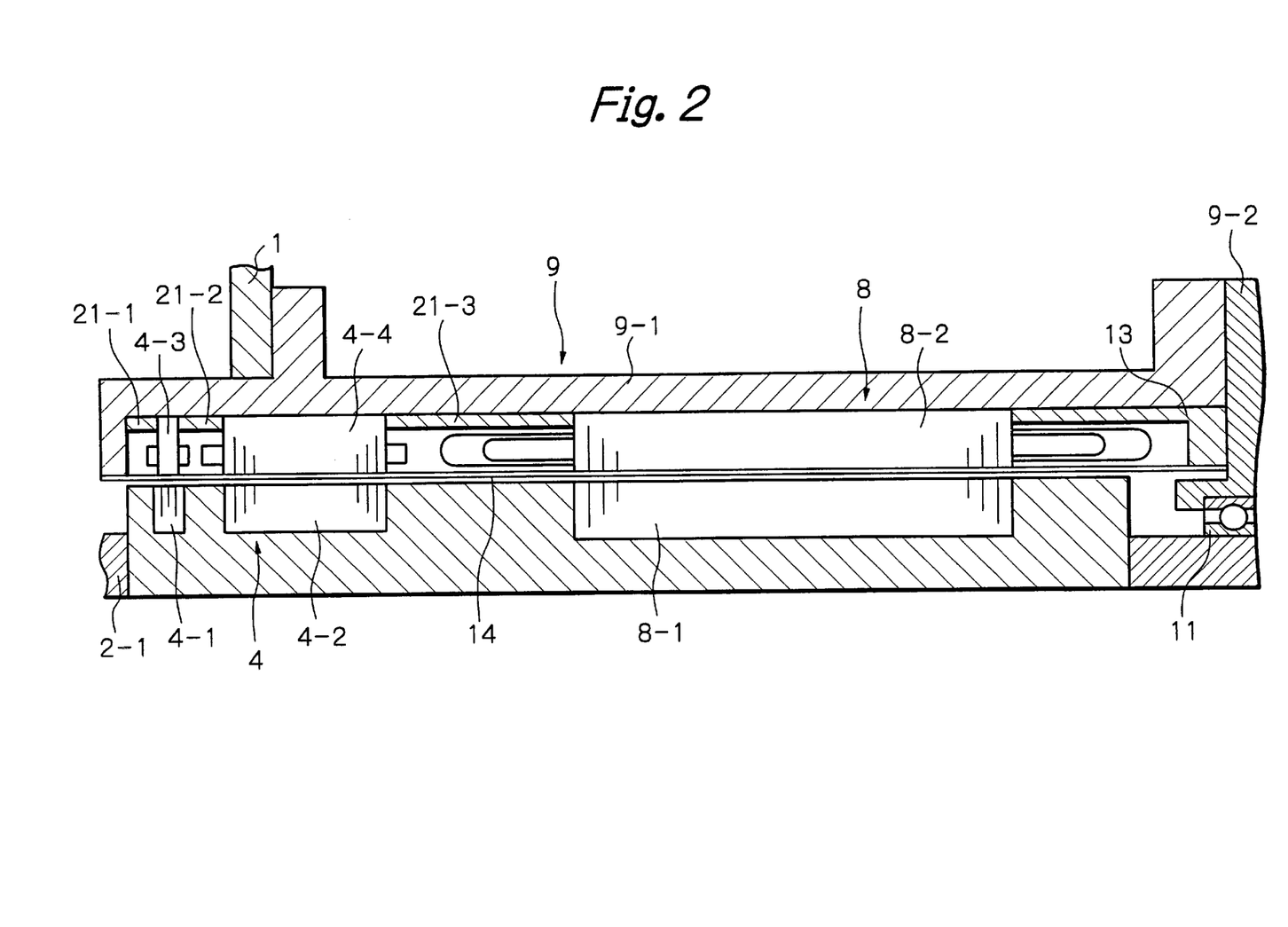
FIG. 2 is a cross-sectional view showing detailed constructions of a motor and a radial magnetic bearing in a drive-side casing in FIG. 1.

FIG. 2 is a view showing detailed constructions of the radial magnetic bearing 4 and the motor 8 in the drive-side casing 9. The displacement sensor, 4-3 and the stator-side magnetic pole 4-4 of the radial magnetic bearing 4 and the stator 8-2 of the motor 8 are accommodated in the casing body 9-1 in a state where their relative positions are individually determined with spacers 21-1, 21-2, and 21-3 and the side plate 13.

In inner-circumferential surfaces of the displacement sensor 4-3, the stator-side magnetic pole 4-4, and the stator 8-2, the can 14, which is as a thin-wall cylinder, is inserted, and two ends thereof are fixed, for example, by welding. The can 14 is formed of a material which has anti-corrosion characteristics against process gases. The plate of the can 14 is sufficiently thick to withstand the hermetic pressure of the process gas 3.

Figure 3:
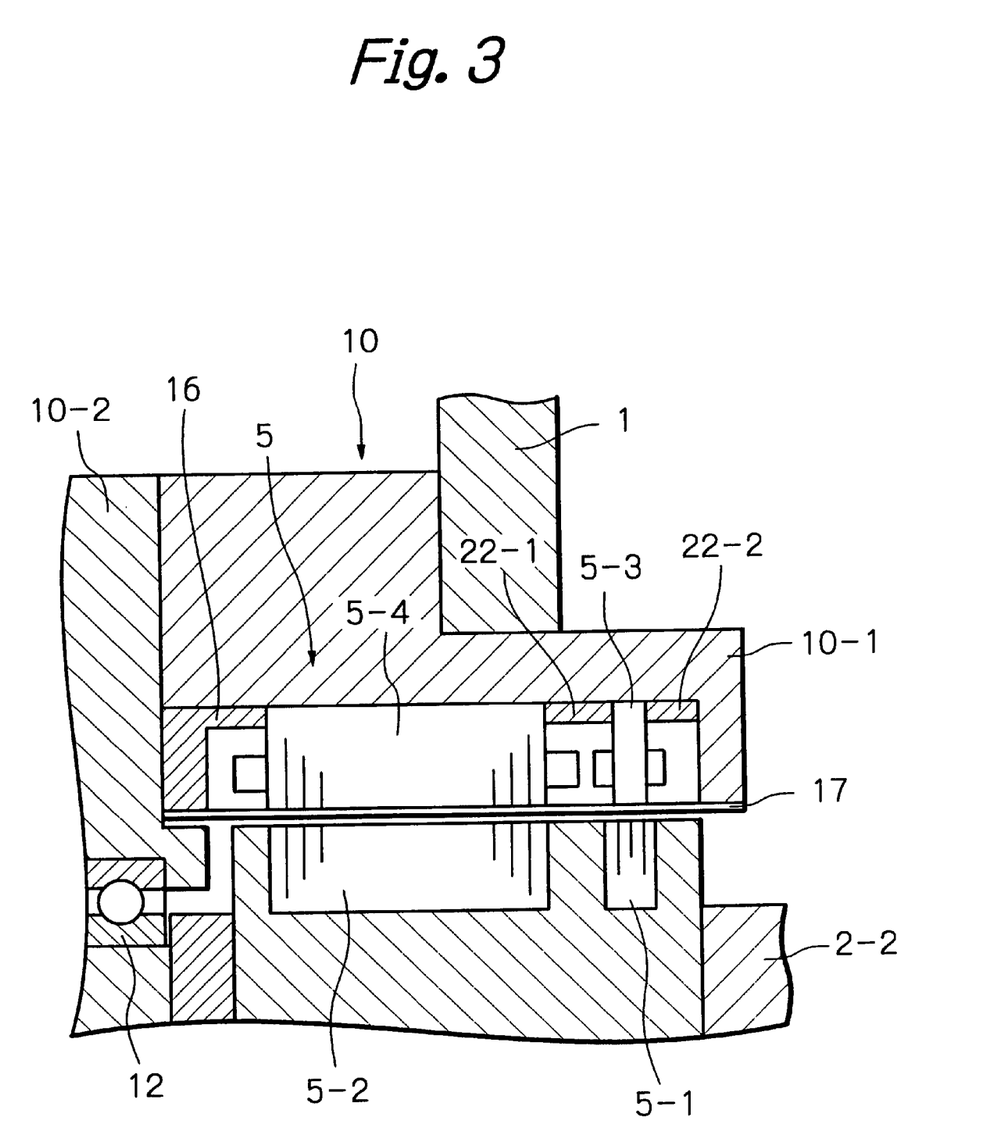
FIG. 3 is a cross-sectional view showing a detailed construction of a radial magnetic bearing in a non-drive-side casing in FIG. 1.

FIG. 3 is a view showing a detailed construction of the radial magnetic bearing 5 in the non-drive-side casing 10. The displacement sensor 5-3 and the stator-side magnetic pole 5-4 of the radial magnetic bearing 5 are accommodated in the casing body 10-1 in a state where their relative positions are individually determined with spacers 22-1 and 22-2 and the side plate 13.

In inner-circumferential surfaces of the displacement sensor 5-3 and the stator-side magnetic pole 5-4, the can 17, which is as a thin-wall cylinder, is inserted, and two ends thereof are fixed, for example, by welding. The can 17 is formed of a material which has anti-corrosion characteristics against process gases. The plate of the can 17 is sufficiently thick to withstand the hermetic pressure of the process gas 3.

Figure 4:
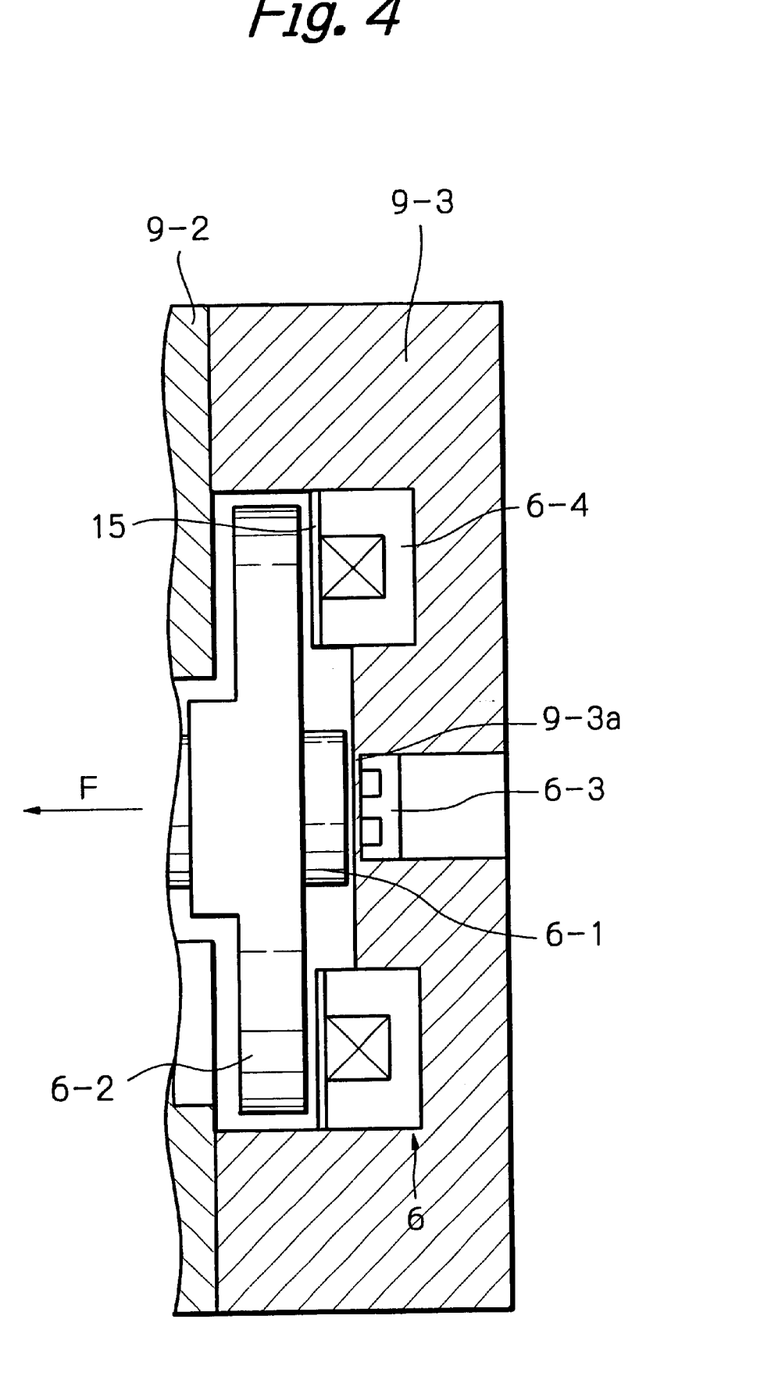
FIG. 4 is a cross-sectional view showing a detailed construction of an axial magnetic bearing fixed to the drive-side casing in FIG. 1.

FIG. 4 is a cross-sectional view showing a detailed construction of the axial magnetic bearing 6 provided in the drive-side casing 9. The stator-side magnetic pole 6-4 of the axial magnetic bearing 6 is supported by the bearing cover 9-3. On an outer surface of the stator-side magnetic pole 6-4 of the axial magnetic bearing 6, the can 15, which is as a thin disc, is fixed, for example, by welding. The displacement sensor 6-3 of the axial magnetic bearing 6 is installed at a thin wall section 9-3a of the bearing cover 9-3. A construction of the axial magnetic bearing 7 provided in the non-drive-side casing 10 is identical to that of the axial magnetic bearing 6 described above; therefore, a description regarding this identical construction is omitted.

According to the construction described above, as shown in FIG. 4, in the axial magnetic bearing 6 provided in the drive-side casing 9, thrust against an axial load in the left direction as viewed occurs; and in the axial magnetic bearing 7 provided in the non-drive-side casing 10, thrust in the direction opposing the abovementioned direction occurs; that is, thrust in opposite directions occurs to support axial loads in the opposite directions.

In this circulation fan apparatus having such an arrangement as described above, the respective cans 14, 17, 15, 18 and the can 14 are arranged between the rotor-side magnetic pole 4-2 and stator-side magnetic pole 4-4 of the radial magnetic bearing 4, between the rotor-side magnetic pole 5-2 and stator-side magnetic pole 5-4 of the radial magnetic bearing 5, between the rotor-side magnetic pole 6-2 and the stator-side magnetic pole 6-4 of the axial magnetic bearing 6, between the rotor-side magnetic pole 7-2 and the stator-side magnetic pole 7-4 of the axial magnetic bearing 7, and between rotor 8-1 and the stator 8-2 of the motor 8; and these cans are communicated with the hermetic vessel 1 to form the hermetic space.

In the hermetic space there are arranged the rotor-side magnetic pole 4-2 of the radial magnetic bearing 4, rotor-side magnetic pole 5-2 of the radial magnetic bearing 5, rotor-side magnetic pole 6-2 of the axial magnetic bearing 6, the rotor-side magnetic pole 7-2 of the axial magnetic bearing 7, and rotor 8-1 of the motor 8. In the outside of the space there are arranged the stator-side magnetic pole 4-4, the stator-side magnetic pole 5-4, the stator-side magnetic pole 5-4, the stator-side magnetic pole 6-4, the stator-side magnetic pole 7-4, and the stator 8-2 which oppose the stator-side magnetic poles 4-2, 5-2, 6-2, 7-2 and the rotor 8-1 described above, respectively. By this arrangement, materials that would contaminate the process gas 3 can be excluded from the hermetic vessel 1.

Furthermore, since the drive-side rotor 2-1 and the non-drive-side rotor 2-2 of the circulation fan 2 are rotatably supported by radial magnetic bearing 4, the radial magnetic bearing 5, the axial magnetic bearing 6, and the axial magnetic bearing 7 without being contacted, metal dust resulting from friction and the like can be avoided. According to this, the service life of the process gas 3 can be longer. Furthermore, since magnetic bearings are used, maintenance-free operation can be realized.

Furthermore, since the circulation fan 2 is rotated by a driving force generated by the action of the rotor 8-1 fixed to the drive-side rotor 2-1 of the circulation fan 2 and the opposing stator 8-2 of the motor 8, magnetic coupling as a force transmission means is not required, so that it is possible to make smaller the installation space for the apparatus.

Incidentally, in the above embodiment, a motor is mounted at one side and two opposite sides are distinguished as a drive side at which the motor is mounted and as a non-drive side at which the motor is not mounted; however, a construction may be such that motors are mounted at the two opposite sides to rotate the circulation fan 2 at a higher speed.

Figure 5:
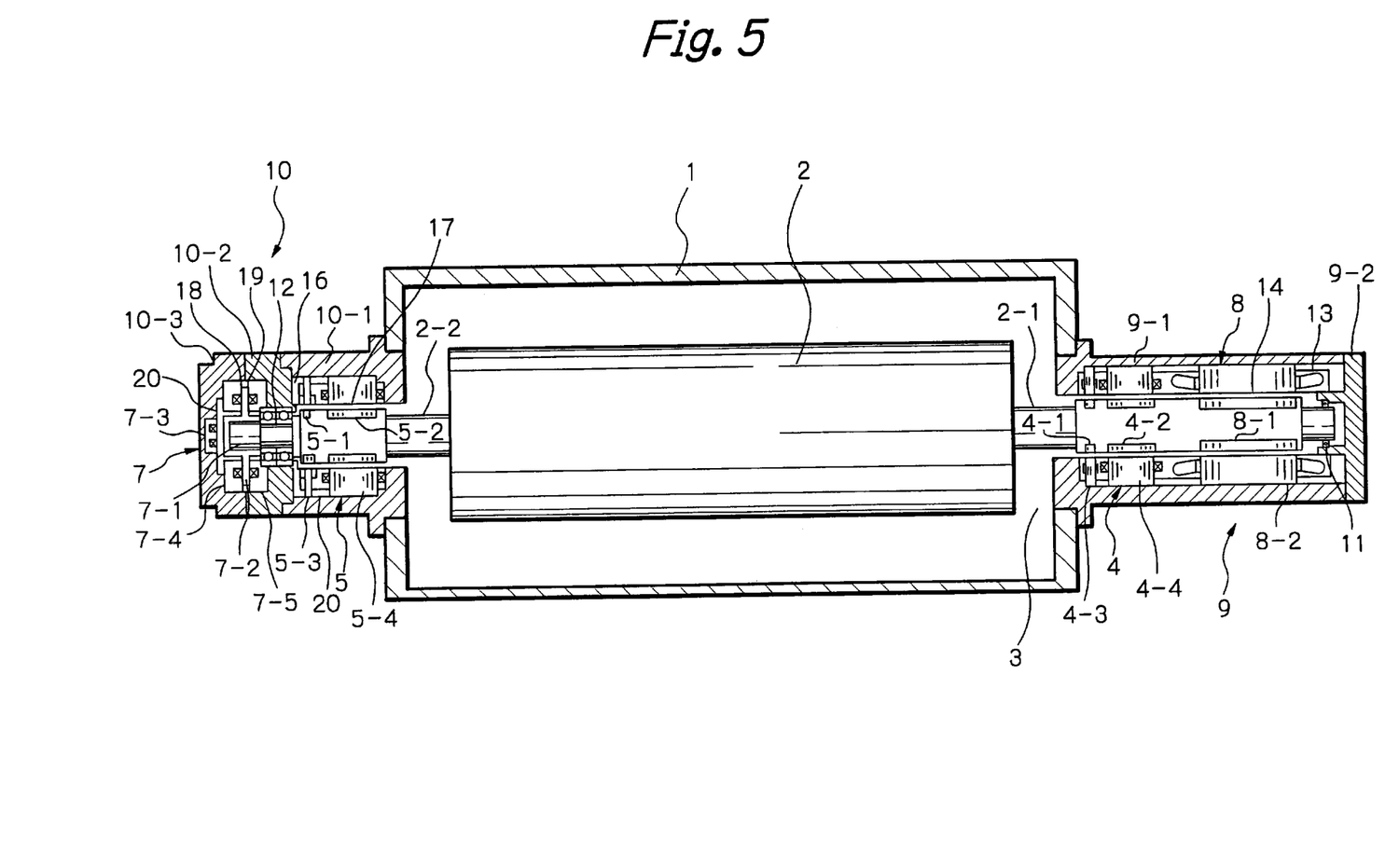
FIG. 5 is a cross-sectional view showing another example of construction of a circulation fan apparatus according to the present invention.

FIG. 5 shows another construction example of a circulation fan apparatus according to the present invention. The circulation fan apparatus of this embodiment is the same as the aforementioned circulation fan apparatus with respect to an arrangement in which a corrosive process gas 3 necessary for effecting various chemical or physical processes is sealingly contained in a hermetic vessel 1 at a predetermined pressure, and the process gas 3 is circulated by circulation fan 2 to perform predetermined processes.

A drive-side rotor 2-1 and a non-drive-side rotor 2-2 are fixed at two opposite sides of the circulation fan 2. The drive-side rotor 2-1 is rotatably supported by a control-type radial magnetic bearing 4. The non-drive-side rotor 2-2 is rotatably supported by a control-type radial magnetic bearing 5 and an axial magnetic bearing 7. The circulation fan 2 is rotationally driven by a motor 8 through the drive-side rotor 2-1.

To the drive-side rotor 2-1 there are fixed a displacement sensor target 4-1 and a rotor-side magnetic pole 4-2 of the radial magnetic bearing 4, a rotor 8-1 of the motor 8. To the non-drive-side rotor 2-2, there are fixed a displacement sensor target 5-1 and a rotor-side magnetic pole 5-2 of the radial magnetic bearing 5, and a displacement sensor target 7-1 and rotor-side magnetic pole 7-2 of the axial magnetic bearing 7.

The displacement sensor target 4-1 and the rotor-side magnetic pole 4-2 of the radial magnetic bearing 4, and the displacement sensor target 5-1 and the rotor-side magnetic pole 5-2 of the radial magnetic bearing 5 are formed by overlaying thin silicon steel plates. To prevent corrosion under the process gas 3, an anti-corrosion coating, for example. Ni-plating or Teflon-coating, is applied to the surfaces of the silicon steel plates, or the surfaces can be covered by a thin plate of an anti-corrosive nonmagnetic material.

The displacement sensor targets 4-1 and 5-1 and the rotor-side magnetic poles 4-2 and 5-2 of the radial magnetic bearings 4 and 5 and displacement sensor targets 7-1 and 7-2 of the axial magnetic bearing 7 may be formed of Permalloy. Since Permalloy includes a large amount of nickel so as to increase anti-corrosion characteristics, anti-corrosion processing can be omitted for the surfaces of the displacement sensor targets 4-1 and 5-1 and the rotor-side magnetic poles 4-2 and 5-2 of the radial magnetic bearings 4 and 5, and displacement sensor targets 7-1 and 7-2 of axial magnetic bearing 7. Accordingly, the distance between the rotor-side magnetic poles 4-2 and 5-2 and stator-side magnetic poles 4-4 and 5-4, and the distance between the rotor-side magnetic pole 7-2 of the axial magnetic bearing 7 and the left and right stator-side magnetic poles 7-4 and 7-5 can be reduced, by which performance and efficiency of the radial magnetic bearings 4 and 5 and the axial magnetic bearing 7 can be improved.

On the other hand, a drive-side casing 9 and a non-drive-side casing 10 are provided at two opposite sides of the hermetic vessel 1. The drive-side casing 9 is formed of a casing body 9-1 and a housing 9-2 for a protection bearing 11. The non-drive-side casing 10 is formed of a casing body 10-1 and a housing 10-2 for a protection bearing, and a bearing cover 10-3.

The casing body 9-1 of the drive-side casing 9 accommodates a displacement sensor 4-3 and a stator-side magnetic pole 4-4 of the radial magnetic bearing 4, and a stator 8-2 of the motor 8. At an inner-circumferential end of the casing body 9-1 on a side of the hermetic vessel 1 and at an inner-circumferential end of a side plate 13, a can 14 is fixed in a manner such as by welding.

The casing body 10-1 of the non-drive-side casing 10 accommodates a displacement sensor 5-3 and a stator-side magnetic pole 5-4 of the radial magnetic bearing 5. At an inner-circumferential end of the casing body 10-1 on a side of the hermetic vessel 1 and at an inner-circumferential end of a side plate 16, a can 17 is fixed, for example, by welding.

In the housing 10-2 for the protection bearing 12, the right-stator-side magnetic pole 7-5 of the axial magnetic bearing 7 is installed; and on an outer surface of the right-stator-side magnetic pole 7-5, a can 19 is fixed, for example, by welding. In the bearing cover 10-3, the left-stator-side magnetic pole 7-4 and a displacement sensor 7-3 of the axial magnetic bearing 7 is installed; and on outer surfaces of the left-stator-side magnetic pole 7-4 and the displacement sensor 7-3, a can 18 and a can 20 are fixed, respectively, for example, by welding.

The cans 14, 17, 18, 19, and 20 are formed of a nonmagnetic material which has anti-corrosion characteristics against process gases and does not disrupt magnetic-flux lines generated by the axial magnetic bearing 7 and the motor 8. By this, corrosion caused by processing gases can be prevented, and deleterious effects are not experienced in the performance of the radial magnetic bearings 4 and 5, the axial magnetic bearing 7, and the motor 8. Since these cans 14, 17, 18, 19, and 20 are components constituting the hermetic vessel 1, their plates are sufficiently thick to withstand the hermetic pressure.

Particularly, for the process gas 3 including a fluorine gas or a chlorine gas, by use of a material such as austenitic stainless steel or a nickel-molybdenum-chromium alloy for the cans 14, 17, 18, 19, and 20, corrosion by the process gas 3 can be prevented for the cans 14, 17, 18, 19, and 20. Since the austenitic stainless steel and the nickel-molybdenum-chromium alloy have higher mechanical strength, the cans 14, 17, 18, 19, and 20 of thinner plates can be used. Furthermore, since these materials are nonmagnetic, the radial magnetic bearings 4 and 5, the axial magnetic bearing 7, and the motor 8 are able to operate effectively. Nevertheless, since the material of these cans differs depending upon the process gas, the hermetic pressure, and the like, it is not restricted to materials such as austenitic stainless steel and the nickel-molybdenum-chromium alloy, and it may be a thin plate, a protection layer of thin films, or the like of a different material.

Figure 6:
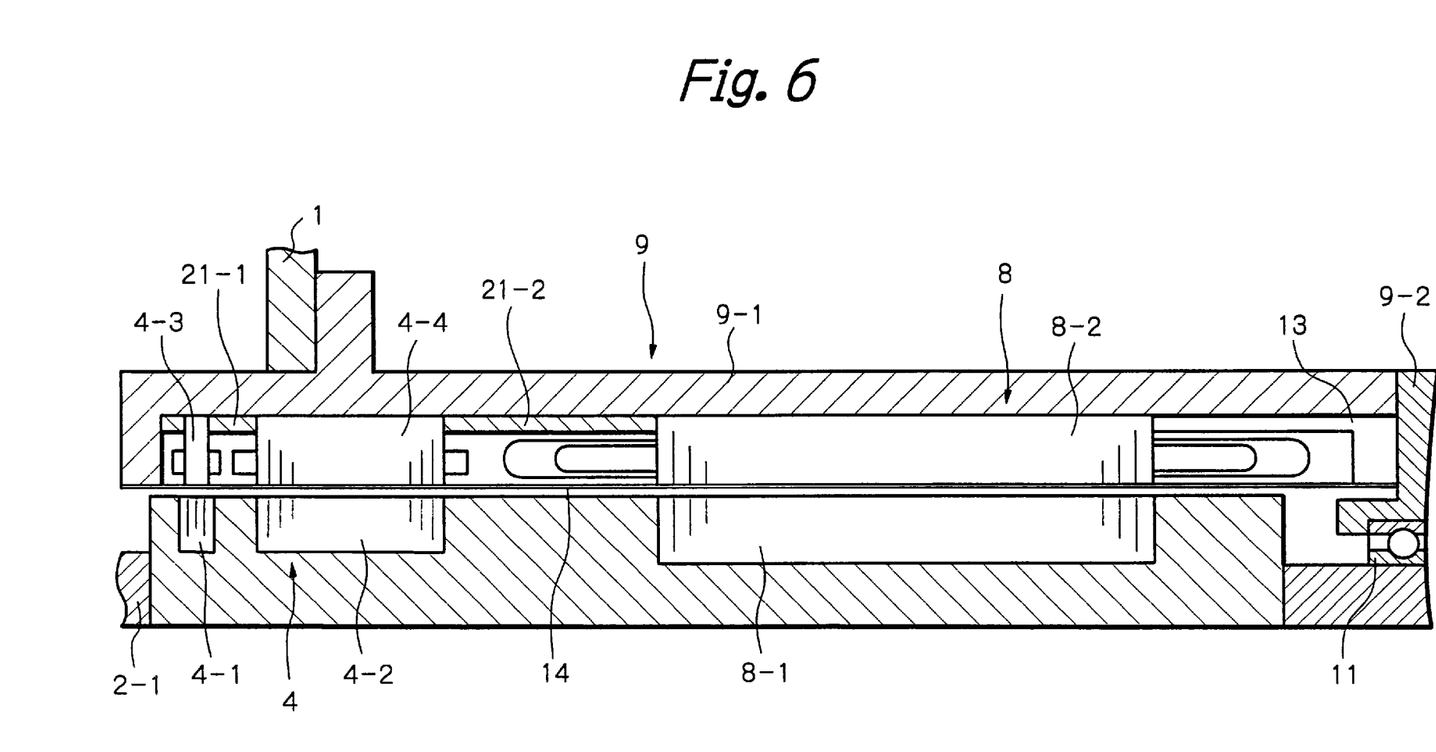
FIG. 6 is a cross-sectional view showing detailed constructions of a motor and a radial magnetic bearing in a drive-side casing in FIG. 5.

FIG. 6 is a view showing detailed constructions of the drive-side radial magnetic bearing 4 and the motor 8 in the drive-side casing 9. The displacement sensor 4-3 and the stator-side magnetic pole 4-4 of the radial magnetic bearing 4 and the stator 8-2 of the motor 8 are accommodated in the casing body 9-1 in a state where their relative positions are individually fixed with spacers 21-1 and 21-2 and the side plate 13. In inner-circumferential surfaces of the displacement sensor 4-3, the stator-side magnetic pole 4-4, and the stator 8-2 of the motor 8, the can 14, which is as a thin-wall cylinder, is inserted, and two ends thereof are fixed, for example, by welding to an inner-circumferential end of the casing body 9-1 on a side of the hermetic vessel 1 and to the inner-circumferential end of the side plate 13.

Figure 7:
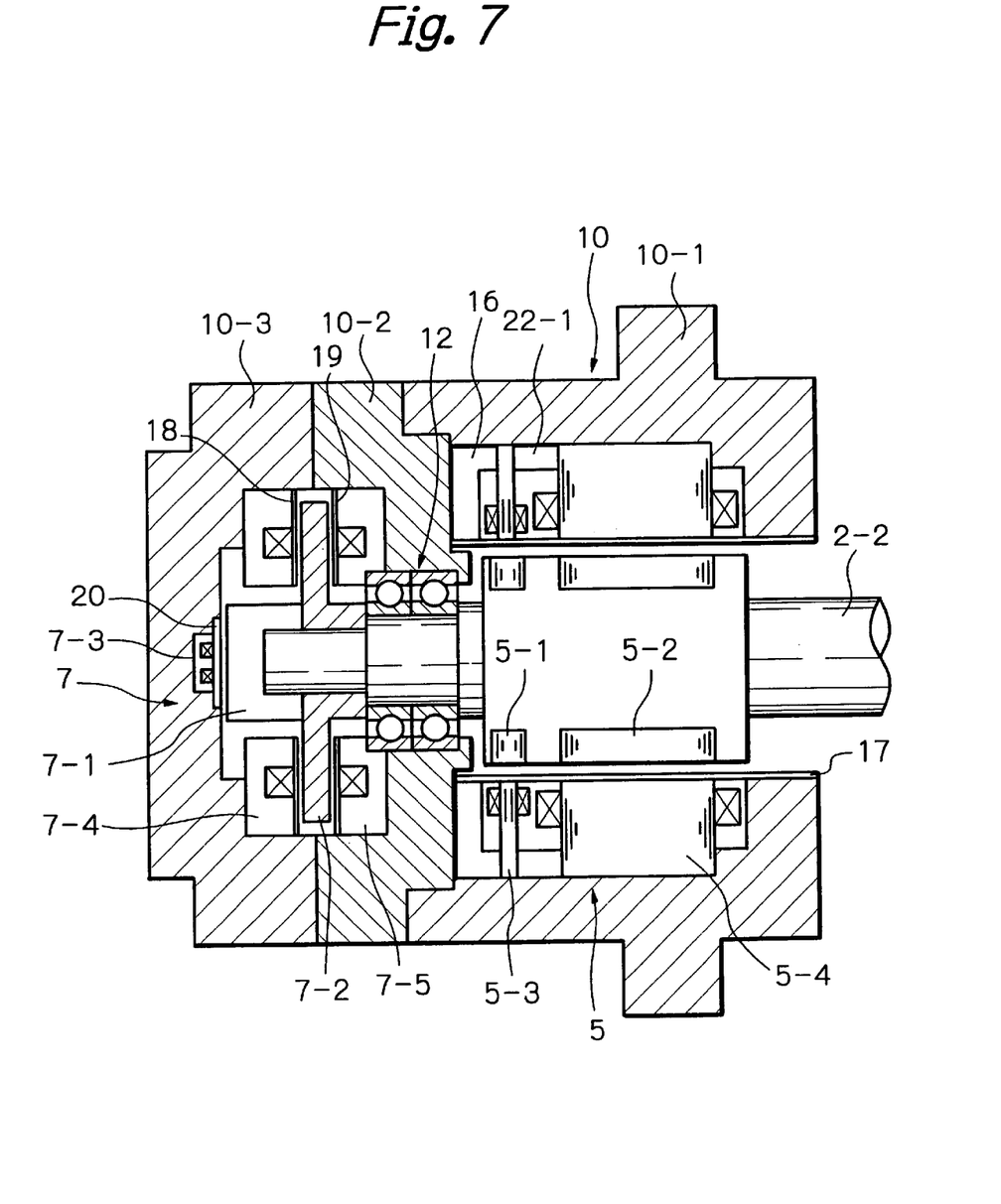
FIG. 7 is a cross-sectional view showing detailed constructions of an axial magnetic bearing and a radial magnetic bearing in a non-drive-side casing in FIG. 5.

FIG. 7 is a view showing detailed constructions of the non-drive-side radial magnetic bearing 5 and the axial magnetic bearing 7. The displacement sensor 5-3 and the stator-side magnetic pole 5-4 of the radial magnetic bearing 5 are accommodated in the casing body 9-1 in a state where their relative positions are individually fixed with spacer 22-1 and the side plate 16. In inner-circumferential surfaces of the displacement sensor 5-3 and the stator-side magnetic pole 5-4, the can 17, which is as a thin-wall cylinder, is inserted, and two ends thereof are fixed, for example, by welding to an inner-circumferential end of the casing body 10-1 on a side of the hermetic vessel 1 and to the inner-circumferential end of the side plate 16.

Furthermore, the right-stator-side magnetic pole 7-5 and the left-stator-side magnetic pole 7-4 of the axial magnetic bearing 7 are accommodated in the housing 10-2 for the protection bearing and the bearing cover 10-3 at positions opposing to each other. The displacement sensor 7-3 is accommodated in the bearing cover 10-3.

Outer surfaces of the right-stator-side magnetic pole 7-5, the left-stator-side magnetic pole 7-4, and the displacement sensor 7-3 of the axial magnetic bearing 7 are covered with the thin-disc-like cans 19, 18, and 20 which are fixed thereon, for example, by welding.

Incidentally, in the above example, a motor is mounted at one side, and two opposite sides are distinguished as a drive side at which the motor is mounted and as a non-drive side at which the motor is not mounted. However, a construction may be used whereby the motors are mounted at the two opposite sides to rotate the circulation fan 2 at a higher speed.

In this circulation fan apparatus having such an arrangement as described above, in the same way as in the case of the circulation fan apparatus shown in FIGS. 1 to 4, materials that would contaminate the process gas 3 can be completely excluded, metal dust resulting from sliding and the like can be avoided, and the service life of the process gas 3 can be increased. Furthermore, since magnetic bearings are adopted, maintenance-free operation can be realized, by which a magnetic coupling as a force transmission means can be omitted, so that it is possible to reduce the installation space for the apparatus.

INDUSTRIAL APPLICABILITY

As described above, according to a first aspect of the present invention, magnetic bearings are adopted as bearings for rotatably supporting rotors of a circulation fan, displacement sensor targets and rotor-side magnetic poles of the magnetic bearings are fixed to the rotors of the circulation fan and are disposed in a hermetic space, and displacement sensors and stator-side magnetic poles of the magnetic bearings are disposed outside of a hermetic vessel with cans or protection layers interposed therebetween. Therefore, superior advantages, as described below, can be obtained.

① Degradation of process gases can be avoided, maintenance of the apparatus can be reduced, and stable processing (apparatus operation) can be continuously performed. Particularly, these advantages are notable when the circulation fan is rotated at a higher speed and a load for supporting the fan is greater.

② Since the circulation fan in the hermetic vessel can be supported by the magnetic bearings without being contacted, maintenance-free bearings can be realized.

Furthermore, according to a second aspect of the present invention, a motor rotor is fixed to a rotor of the circulation fan, the motor rotor is disposed in the hermetic space communicating with the hermetic vessel, and a motor stator opposing the motor rotor is disposed outside of the hermetic vessel with the can or the protection layer interposed therebetween. In this case, degradation of the process gas can be avoided; and since a rotational driving force is provided to the circulation fan from the rotor, magnetic coupling is not required and an installation space can be made small.

Furthermore, according to a third aspect of the present invention, either the displacement sensor targets of the control-type bearings or the rotor-side magnetic poles or both of them are formed of Permalloy; therefore, anti-corrosion processing can be omitted for surfaces of the displacement sensor targets and the rotor-side magnetic poles. Accordingly, a distance between the rotor and stator can be reduced, by which performance and efficiency of the magnetic bearings can be improved.

Furthermore, according to a fourth aspect of the present invention, since the cans are formed of austenitic stainless steel, corrosion by the process gas can be avoided; and since the austenitic stainless steel has superior mechanical strength, cans formed from thinner plates can be used, by which the distance between the individual rotors and stators of the magnetic bearings and the motor can be reduced to improve performance and efficiency of the magnetic bearings and the motor. In addition, since the austenitic stainless steel is a non-magnetic material, improvement in performance and efficiency and a reduction in size of the magnetic bearings can be realized without disrupting a magnetic force generated by the magnetic bearings and the motor.

Furthermore, according to a fifth aspect of the present invention, since the cans are formed of a nickel-molybdenum-chromium alloy, corrosion by the process gas can be avoided; and since the nickel-molybdenum-chromium alloy has higher mechanical strength, cans formed from thinner plates can be adopted, by which the distance between the individual rotors and stators of the magnetic bearings and the motor can be reduced to improve performance and efficiency of the magnetic bearings and the motor. Furthermore, the nickel-molybdenum-chromium alloy is non-magnetic, improvement of performance and efficiency and size reduction of the magnetic bearings can be realized without disrupting a magnetic force generated by the magnetic bearings and the motor.

What is claimed is:

1. A circulation fan apparatus including
    a hermetic vessel (1) containing a corrosive process gas therein and
    a circulation fan (2) installed in said hermetic vessel for circulating said corrosive gas within said hermetic vessel, rotors (2-1, 2-2) of said circulation fan are rotatably supported by bearings, wherein
        said bearings comprise radial magnetic bearings (4,5), said radial magnetic bearings are disposed on opposite sides of said circulation fan,
        displacement sensor targets (4-1, 5-1) and rotor-side magnetic poles (4-2, 5-2) of said radial magnetic bearings (4,5) are fixed to the rotors (2-1, 2-2) of said circulation fan (2) and are disposed in a hermetic space communicating with said hermetic vessel, and
        displacement sensors (4-3, 5-3) and stator-side magnetic poles (4-4, 5-4) opposing said displacement sensor targets and rotor-side magnetic poles are disposed outside of said hermetic vessel with cans or protection layer (14, 17) being interposed between the displacement sensors and stator-side magnetic poles and the displacement sensor targets and rotor-side magnetic poles,
        wherein said displacement sensors (4-3, 5-3) are disposed adjacent to said stator-side magnetic poles (4-4, 5-4), respectively.

2. A circulation-fan driving motor in combination with a circulation fan apparatus as claimed in claim 1, wherein a motor rotor (8-1) is fixed to at least one rotor (201, 2-2) of said circulation fan, said motor rotor is disposed in said hermetic space communicating with said hermetic vessel (1), and a motor stator (8-2) opposing said motor rotor is disposed outside of said hermetic vessel, with the can or the protection layer (14) being interposed therebetween.

3. A circulation fan apparatus as claimed in claim 1, wherein an anti-corrosion coating is applied to a surface of said displacement sensor targets (4-1, 5-1) and the rotor-side magnetic poles (4-2, 5-2) of said radial magnetic bearings (4, 5), or said surface is covered by a thin plate of an anti-corrosive material.

4. A circulation fan apparatus as claimed in claim 1, wherein either the displacement sensor targets (4-1, 5-1) or the rotor-side magnetic poles (4-2, 5-2) of said radial magnetic bearings or both of them are formed of permalloy.

5. A circulation fan apparatus including
    a hermetic vessel (1) containing a corrosive process gas therein and
    a circulation fan (2) installed in said hermetic vessel for circulating said corrosive gas within said hermetic vessel, rotors (2-1, 2-2) of said circulation fan are rotatably supported by bearings, wherein
        said bearings comprise radial magnetic bearings (4, 5) and at least one axial magnetic bearing (6, 7), said radial magnetic bearings are disposed on opposite sides of said circulation fan,
        displacement sensor targets (4-1, 5-1, 6-1, 7-1) and rotor-side magnetic poles (4-2, 5-2, 6-2, 7-2) of said radial magnetic bearings (4, 5) and axial magnetic bearings (6, 7) are fixed to the rotors (2-1, 2-2) of said circulation fan (2) and are disposed in a hermetic space communicating with said hermetic vessel, and displacement sensors (4-3, 5-3, 6-3, 7-3) and stator-side magnetic poles (4-4, 5-4, 6-4, 7-4) opposing said displacement sensor targets and rotor-side magnetic poles are disposed outside of said hermetic vessel with cans or protection layer (14, 15, 17, 18) being interposed between the displacement sensors and the stator-side magnetic poles and the displacement sensor targets and rotor-side magnetic poles, wherein said displacement sensors (4-3, 5-3, 6-3, 7-3) are disposed adjacent to said stator-side magnetic poles (4-4, 5-4, 6-4, 7-4), respectively.

6. A circulation-fan driving motor in combination with a circulation fan apparatus as claimed in claim 5, wherein a motor rotor (8-1) is fixed to at least one rotor (2-1, 2-2) of said circulation fan, said motor rotor is disposed in said hermetic space communicating with said hermetic vessel (1), and a motor stator (8-2) opposing said motor rotor is disposed outside of said hermetic vessel, with the can or the protection layer (14) being interposed therebetween.

7. A circulation fan apparatus as claimed in claim 5, wherein an anti-corrosion coating is applied to the surface of said displacement sensor targets (4-1, 5-1, 6-1, 7-1) and the rotor-side magnetic poles (4-2, 5-2, 6-2, 7-2) of said radial magnetic bearings and axial magnetic bearing (6, 7), or said surfaces are covered by a thin plate of an anti-corrosive material.

8. A circulation fan apparatus as claimed in claim 5, wherein either the displacement sensor targets (4-1, 5-1, 6-1, 7-1) or the rotor-side magnetic poles (4-2, 5-2, 6-2, 7-2) of said radial and axial magnetic bearings or both of them are formed of permalloy.

9. A circulation fan apparatus as claimed in any one of claims 1 to 8, wherein said apparatus further comprises protection bearings (11, 12) supporting said rotor, said protection bearings are not normally contacted, but are contacted only for emergencies and do not constitute contamination sources.

10. A circulation fan apparatus as claimed in any one of claims 1 to 8, wherein said hermetic vessel (1) is provided with a drive-side casing (9) and a non-drive-side casing (10) at opposite ends thereof, said drive-side casing (9) and said non-drive-side casing (10) comprises a plurality of casing sections, respectively.

11. A circulation fan apparatus as claimed in claim 9, wherein said hermetic vessel (1) is provided with a drive-side casing (9) and a non-drive-side casing (10) at opposite ends thereof, said drive-side casing (9) and said non-drive-side casing (10) comprises a plurality of casing sections, respectively.

* * * * *